Feb. 19, 1952      A. G. ROSE      2,586,263
CONVEYER
Filed Oct. 12, 1944      5 Sheets—Sheet 1
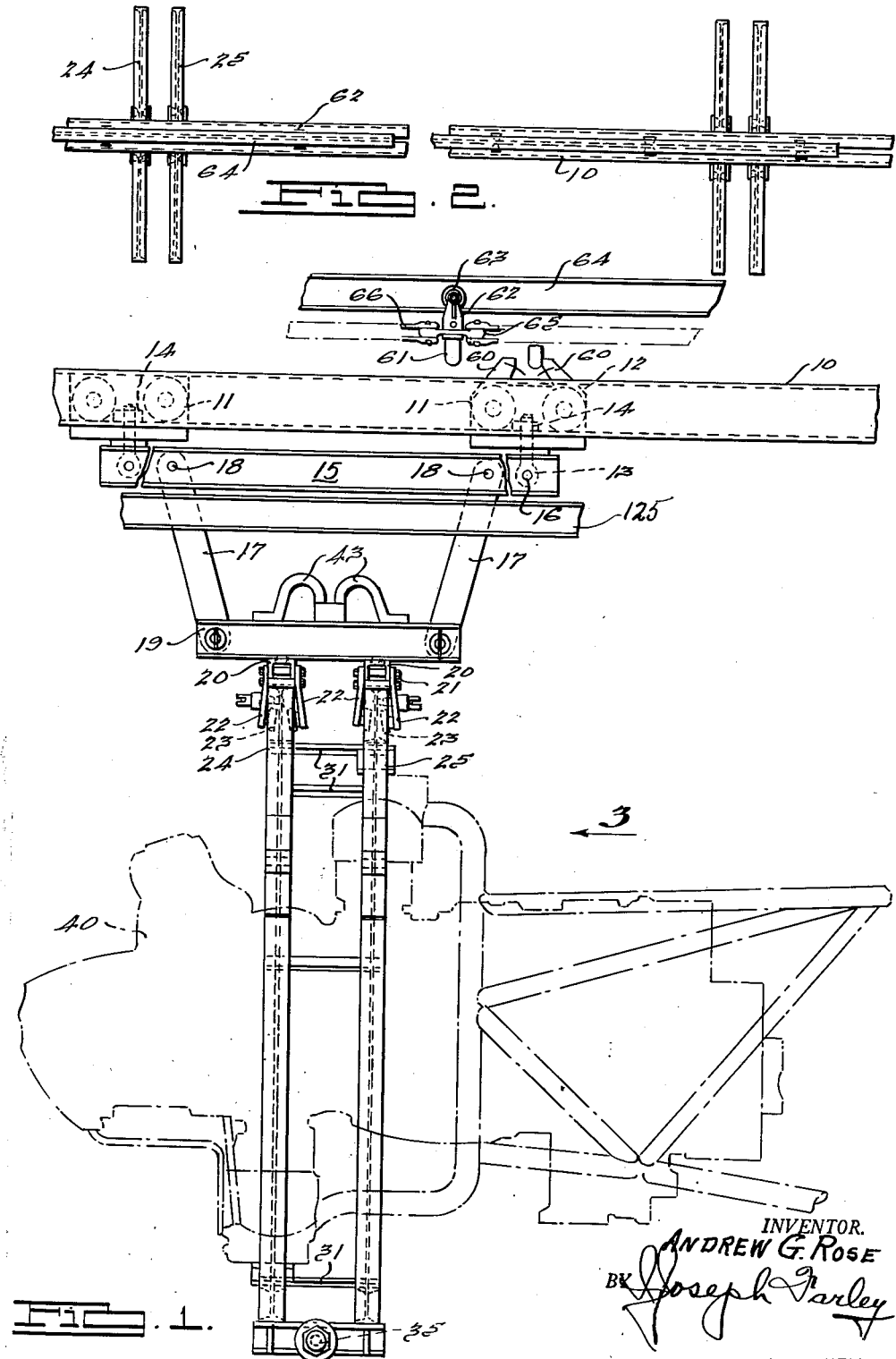
INVENTOR.
ANDREW G. ROSE
BY Joseph Varley
ATTORNEY.

Feb. 19, 1952  A. G. ROSE  2,586,263
CONVEYER
Filed Oct. 12, 1944  5 Sheets-Sheet 2
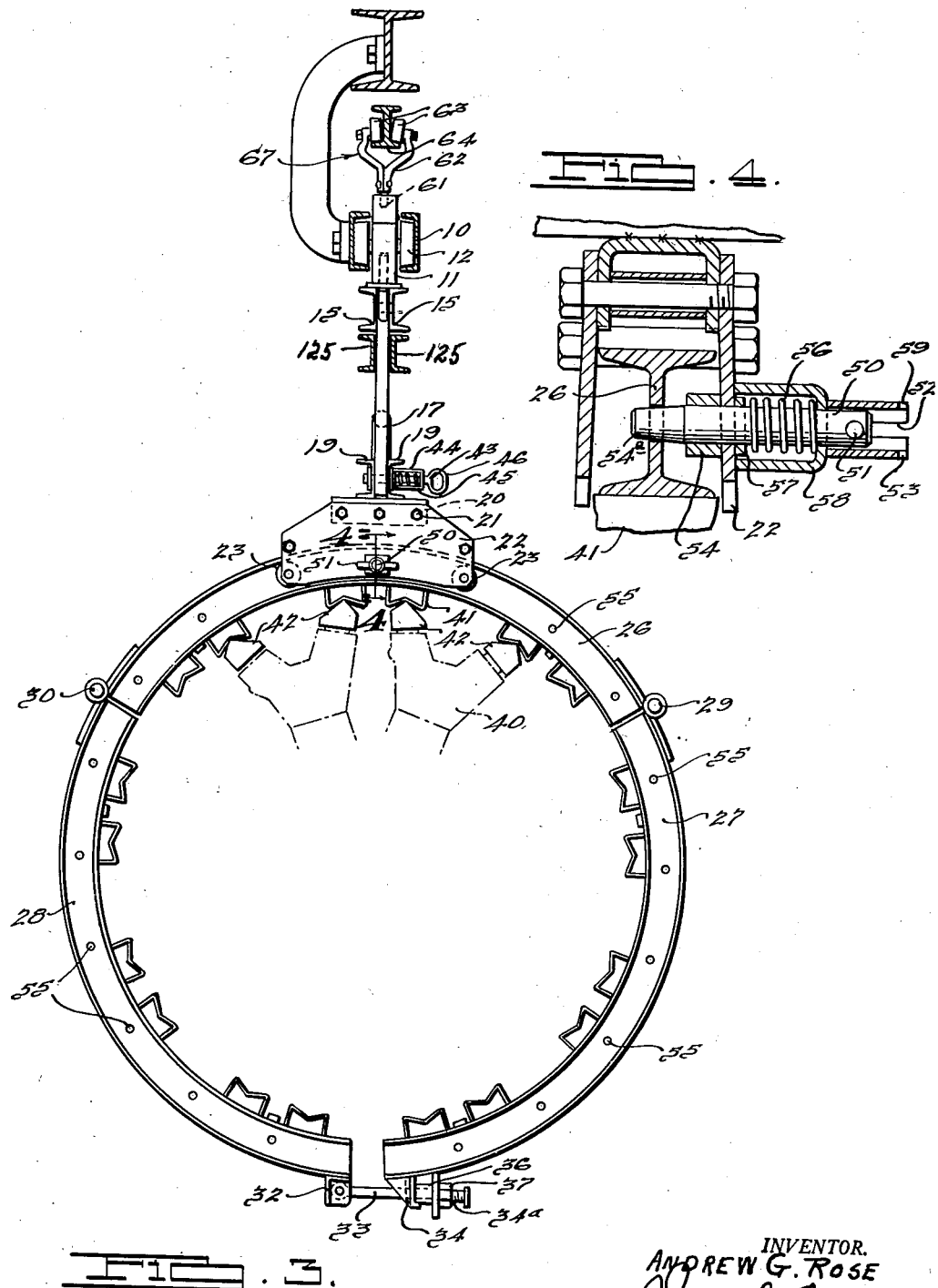
INVENTOR.
ANDREW G. ROSE
BY Joseph Farley
ATTORNEY.

Feb. 19, 1952     A. G. ROSE     2,586,263
CONVEYER
Filed Oct. 12, 1944     5 Sheets-Sheet 3
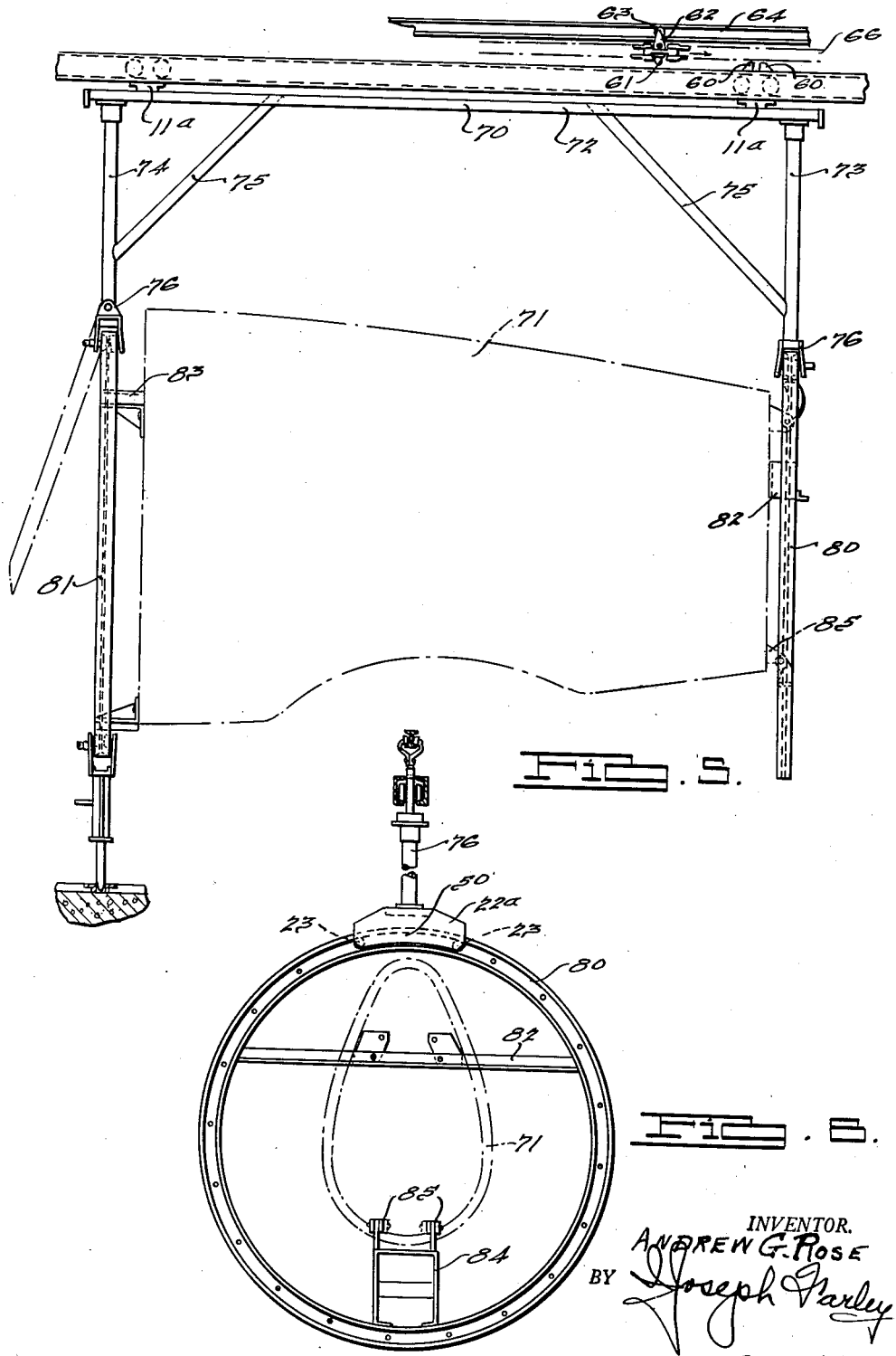
INVENTOR.
ANDREW G. ROSE
BY Joseph Farley
ATTORNEY.

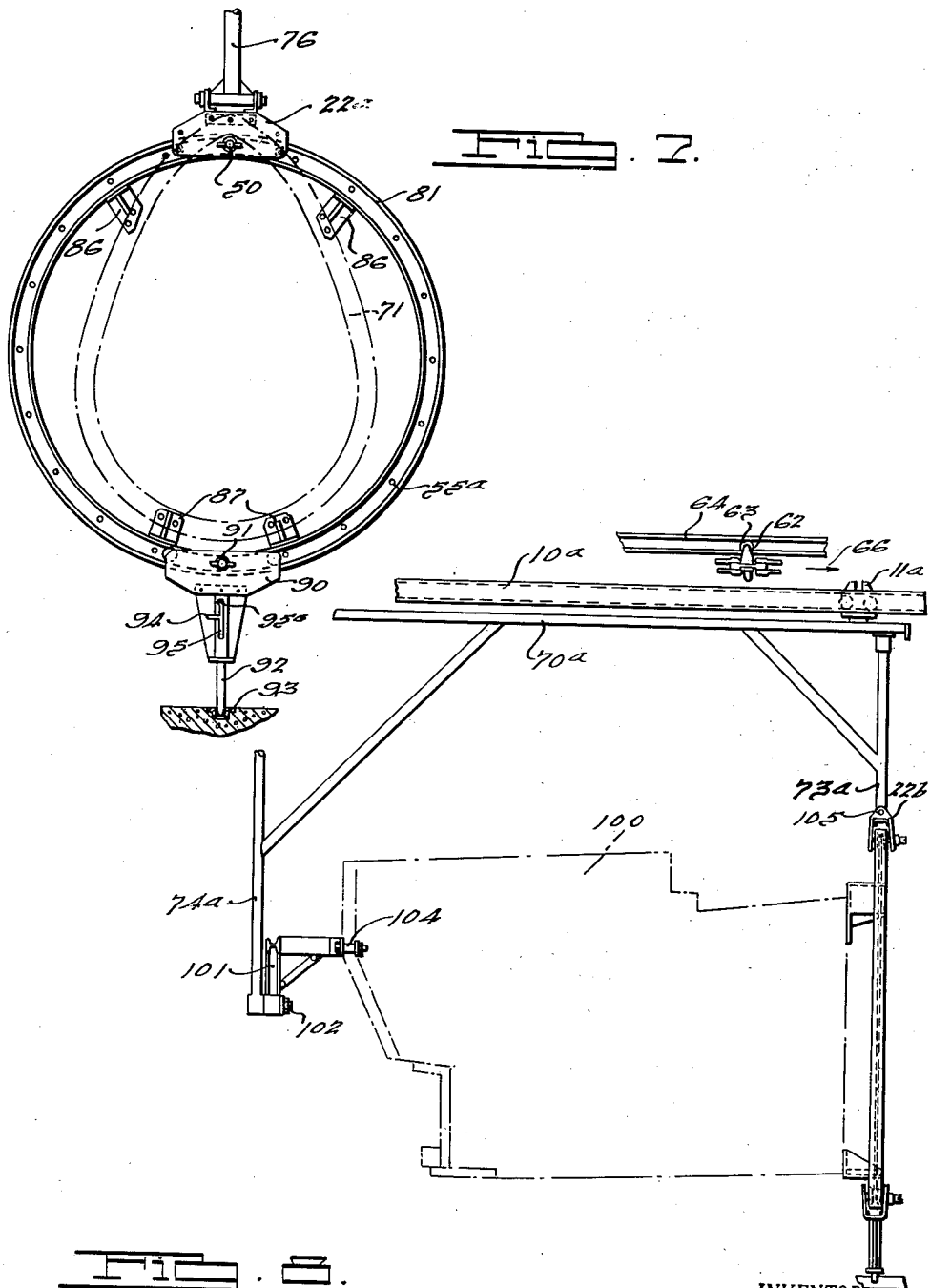

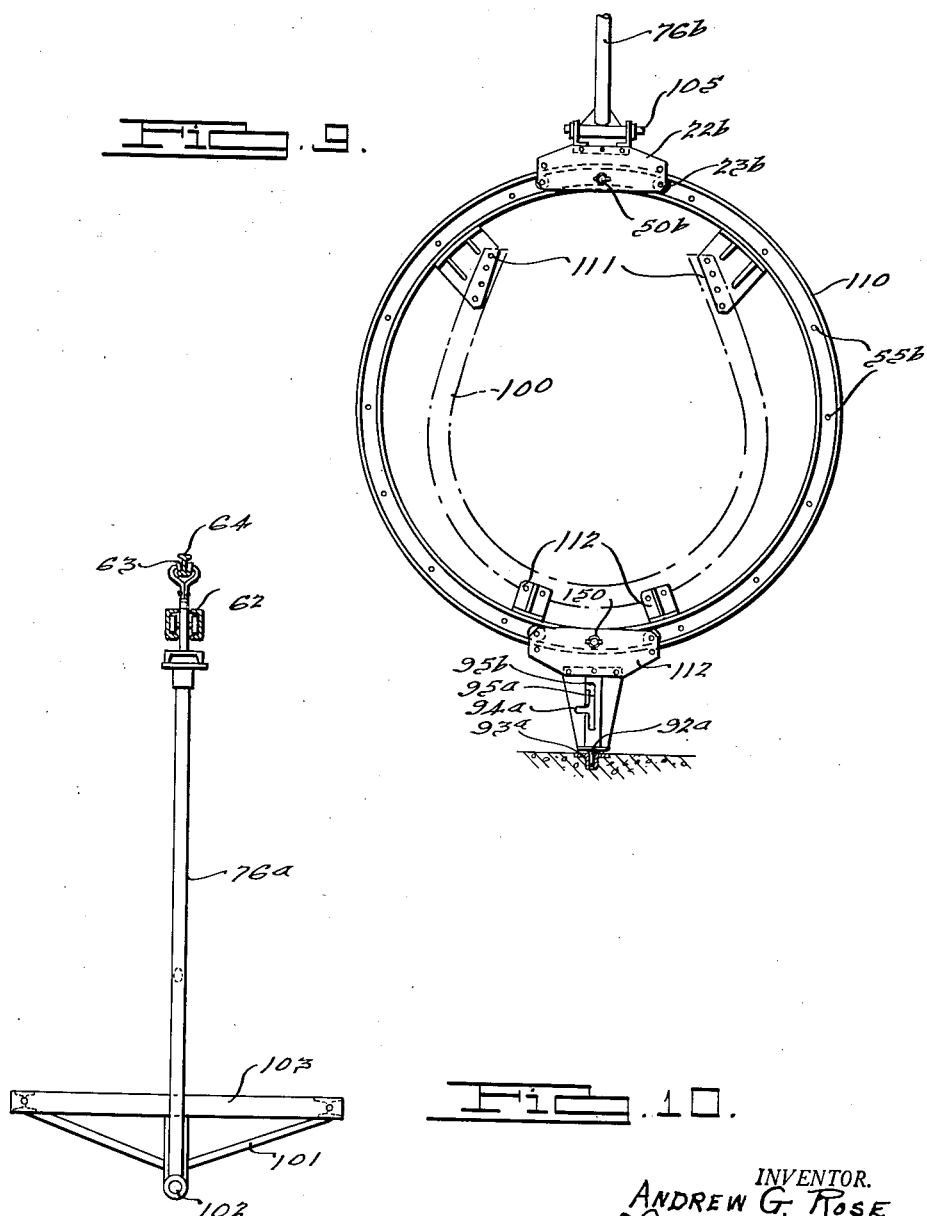

Patented Feb. 19, 1952

2,586,263

UNITED STATES PATENT OFFICE 2,586,263

CONVEYER

Andrew G. Rose, Detroit, Mich., assignor to Jervis B. Webb Company, Detroit, Mich., a corporation of Michigan Application October 12, 1944, Serial No. 558,324

23 Claims. (Cl. 105—156)

This invention relates to conveyor systems used in modern manufacturing plants, and wherein a continuously or intermittently operating endless conveyor, consisting of a driven chain and load carrying trolleys, transports articles from one part of a manufacturing plant to another, and so that various manufacturing operations may be performed by workmen located at various stations along the line of travel of the conveyor.

As a result of the war effort many problems have arisen in connection with the mass production of airplanes and parts therefor, because many airplane parts, particularly engines and fuselage parts and wing parts for large bombers are so large and unwieldy that the types of conveyors heretofore commonly employed for mass production methods do not lend themselves readily to use for the manufacture of airplane parts. For example, the multicylinder engines used in the automotive industry where the cylinders are arranged in what is known as "in-line" have a flat base that can be used as a supporting surface upon which the engine may rest on a roller type conveyor. The radial type engine, however, used in modern airplanes, has its cylinders grouped around and extending radially from a central axis in such a way that no convenient supporting surface is present upon which the engine may be supported in a stable condition. Likewise fuselage and wing parts, the outer skin of which is of very thin metal, cannot ordinarily be transported from place to place upon roller conveyors without danger of damage to the part being transported. As the fuselage and wing parts of large bombing planes are very large, and as many different and varied operations are required to be performed upon different areas or surfaces of such parts, the use of complicated and cumbersome scaffolding has had to be resorted to in order that the workers could obtain access to the particular area to be worked upon. Experience for many years with conveying systems in the automotive industry has proven that the overhead trolley type of conveyor is one of the most satisfactory, because the overhead trolley conveyor may not only be used for transporting parts from one place to another in a plant for the performance of manufacturing operations, but also may be used for storage purposes. Overhead trolley conveyors of the continuous chain type several thousand feet in length have been used successfully for many years in the automotive industry, such conveyors being furnished with lower runs, or reaches, so that the articles carried by the conveyor may be brought along an operating level at a convenient height to be readily accessible to workmen stationed along such operating level and also being supplied with upper runs, or reaches, located near the ceiling of the plant to form, in effect, a storage space for large quantities of parts which have been either entirely, or partially, fabricated, thus leaving large floor areas available for production machinery, which areas would otherwise have to be used for storage purposes.

It has heretofore been more or less standard practice with the overhead trolley type of conveyor to carry the articles being transported by the conveyor upon a single load supporting trolley having a hook or clevis, or other suitable load supporting device which has a swivel connection with the trolley, so that the load is supported with the longitudinal axis of the load in a vertical position and so that the article may be rotated about such longitudinal axis. The longitudinal dimensions of airplane wing and fuselage parts, however, are so great that if such parts were carried upon an overhead trolley conveyor with the longitudinal axes thereof in a vertical position, the height of the conveyor would be prohibitive and the point at which connection between the article being carried and the supporting trolley is made would be so great as to render coupling and uncoupling of the article from the conveyor very cumbersome and difficult.

The principal object of the present invention is, therefore, to provide a new and improved construction for carrier or article fixtures particularly adapted for carrying large cumbersome parts and capable of being associated with and supported by an overhead trolley conveyor.

A further object is to provide clamping jigs, or fixtures, in which irregular shaped articles having considerable length are adapted to be secured and carried by an overhead conveyor, which jigs, or fixtures, may be quickly and easily connected to a supporting trolley, or trolleys, and which when so supported, enable the workpiece to be readily rotated upon a horizontal axis so as to enable any part of the piece to be readily accessible to a workman standing upon a shop floor.

Another object of the invention is to provide means for conveying large pieces from station to station of an assembly or processing line, while providing for rotation of the piece at will, either while being transported or while at rest at a processing station.

A further object of the invention is to provide improved means for clamping or retaining pieces of the nature above indicated, with means for preventing their movement in any direction during the processing thereof.

Another object is to provide handling means of the character indicated, of simple and effective design, particularly well adapted for the handling of work of the nature above indicated.

The above and many other objects, such as simplicity of construction, low manufacturing cost, and compact and sturdy design, will appear more fully to those skilled in the art to which the invention appertains from the following detailed description and by reference to the accompanying drawings forming a part hereof, wherein a satisfactory constructional example is shown as illustrating the principles of the invention.

In the drawings:

Fig. 1 is a side elevation of a section of an overhead trolley conveyor and associated supporting frame work and fixtures adapted for carrying a large radial type engine;

Fig. 2 is a plan view of a conveyor on a reduced scale with parts broken away;

Fig. 3 is an end elevation of the device shown in Fig. 2 viewed in the direction of the arrow 3 of Fig. 1;

Fig. 4 is an enlarged sectional detail view taken on line 4—4 of Fig. 3, showing the detailed construction of a locking pin;

Fig. 5 is a side elevation of a trolley frame and fixture for carrying an airplane wing part;

Fig. 6 is an end elevation of the device shown in Fig. 5 as viewed from the right in Fig. 5;

Fig. 7 is an end elevation of the device shown in Fig. 5 as view from the left in Fig. 5;

Fig. 8 is a side elevation of a further modified form of the invention;

Fig. 9 is a longitudinal elevation of the device shown in Fig. 8 as viewed from the right in Fig. 8, and Fig. 10 is a longitudinal elevation of the device shown in Fig. 8 as viewed from the left in Fig. 8.

As shown in Figs. 1 to 4, the conveyor consists of a main supporting track 10, which is shown as consisting of a pair of channel irons, having their web portions vertically disposed and with the open ends of the channels facing each other in spaced relationship. A trolley bracket 11 is provided with two pairs of trolley wheels 12 arranged to roll upon and be supported by the lower webs of the channel members 10. Depending from the center of each trolley bracket 11 is an eye bolt 13 provided at its upper end with a nut 14, by means of which the eye bolt is secured to the trolley bracket 11.

In the particular constructional example shown in Figs. 1 to 4, the trolley brackets 11 are arranged in pairs and serve to support an article carrying frame which consists of a pair of upper channel irons 15 suitably secured together in spaced relationship. The eye bolts 13 project into the space between the opposed channel irons 15 and are secured thereto by means of pins 16 which pass through suitable apertures provided in the channel iron and through the eye of the eye bolt. Also passing into the space between the channel irons 15 is a pair of links 17, the top ends of which are secured to the channel irons by the pins 18. At their lower ends the links 17 are connected to another pair of channel irons 19 which form an upper frame for supporting the article carrying means presently to be described.

Suitably secured to the lower legs of the channel irons 19, as by welding, are a pair of channel bars 20 to which are bolted, as by the bolts 21, a pair of spaced side plates 22. Each of the side plates 22 carries at its lower end a pair of spaced rollers 23 which project inwardly in spaced relationship to the inner faces of the side plates for engagement with and serve rotatably to support the article carrying frames 24, 25.

The article carrying supports 24, 25 are each of similar construction and comprise a plurality of arcuate I-beam members 26, 27, 28. As shown best in Fig. 3 of the drawings, the two sectional ring members 27, 28 are pivotally connected to the ends of the sectional member 26 by the hinged connections 29 and 30, respectively, for permitting the ring shaped frames to be opened for engagement with or disengagement from a radial type airplane engine. The two ring frames 24, 25 are secured together in spaced relationship by means of a plurality of cross ties 31. At the end of the members 28, opposite to their hinged connection 30, to the member 26, the two members 28 are connected together by a cross brace 32, to which is pivotally connected one end of a clamping bolt 33. The sectional rim members 27, at the ends thereof opposite to their hinged connection 29 of the member 26, are likewise united by a cross brace 34, which at its central portion is provided with a downwardly open elongated slot 35 into which the clamping bolt 33 may be engaged. The clamping bolt 33 has mounted on its free end a bushing 36, which is adapted to be engaged behind a small flange 34a of the cross brace 34, and when the nut 37 on the clamping bolt is screwed home, the bushing 36 will serve to draw the adjacent free ends of the members 27, 28 together and to cause the article carrying frame to be clamped upon the engine or other part which it is adapted to carry.

As the particular article carrying frame shown in Figs. 1 to 4 is particularly designed and adapted for the carrying of a radial type airplane engine, which is characterized by being provided with a plurality of radially extending cylinders 40 which are arranged in two adjacent banks, each of the article carrying frames 24 and 25 is provided on its inner face with a plurality of pads 41, each of which on its inner face is formed to provide a V-shaped recess for engagement with the V-shaped projections 42 formed on the ends of the engine cylinder block.

Suitably secured to the upper faces of the channel irons 19 which form the upper framework for the article carrying members 24, 25 is a pair of U-shaped members 43 with which crane hooks are adapted to be engaged for hoisting or lowering the engine 40 after the article carrying frames 24, 25 have been suitably secured upon the engine.

For the purpose of ready engagement and disengagement of the article carrying frame or fixture with the conveyor trolley, spring pressed pins 43 are provided. These pins 43 are adapted normally to be held in projected or extended position by springs 44 confined between a suitable collar or pin secured to the pins 43 and a U-shaped spring stirrup 45 suitably secured to the side face or web of one of the channel members 19; the pins 43 being provided with a hand grip portion 46 for convenience in retracting the pins and permitting the article carrying fixture to be disconnected from the conveyor trolley. It will, of course, be understood that the channel iron members 19 are each provided with suitably aligned apertures into which the pins 43 are projected by means of the springs 44.

As will be seen from the foregoing, the article carrying frame or fixture 24, 25 is rotatably mounted upon the rollers 33 so that the fixture with an engine frame supported therein may be rotated about the center of the ring frames 24, 25 as an axis to bring various portions of the engine to a suitable position for the performance of fabricating operations thereon by workmen standing on the floor of the plant.

Means are provided for locking the rotatable article carrying fixture in various adjusted positions, and such means comprises a pin 50, having at one end thereof transversely extending hand grip 51 which, as shown in Fig. 3, projects substantially diametrically across and is fixedly secured within the pin 50. The projecting ends of the hand grip member 51 extend through a pair of slots 52 formed in the sleeve 53. The pin 50 projects through a bearing boss 54 secured to the inner face of one of the side plates 22, the inner end of the pin 50 being of reduced tapered form as indicated at 54 for ready engagement with any one of a plurality of holes 55 provided in the webs of the sectional ring members 26, 27, 28. A spring 56 is confined between a collar or washer 57 suitably secured, as by welding, to the pin 50 and a U-shaped spring stirrup 58 is welded to the outer face of the member 22; the spring 56 serving normally to hold the inner end of the pin 50 in engagement with one of the holes 55. The outer face or end of the sleeve 53 is provided with a pair of small notches 59 into which the laterally projecting ends of the hand grip 51 are adapted to be engaged to hold the pin 50 in its retracted position in which it has been moved out of engagement with any one of the holes 55.

As will be seen from the foregoing, the ring fixture 24, 25 may be readily clamped upon an engine after the clamping bolt 33 has been disengaged, the fixture being lowered into proper position for permitting the pads 41 of the engine frame to be engaged with the projections 42 arranged around the periphery of the engine, after which the ring sections 27 and 28 are swung into position for engagement with the engine, the clamping bolt 33 is moved into clamping position and the nut 37 tightened to hold the fixture securely clamped to the engine frame.

After the fixture has been securely clamped on the engine frame, the latter may be hoisted by a crane or other suitable lifting device into juxtaposition to a trolley conveyor, and while the engine and fixture are supported by the crane, the pivoted connecting bars or hinges 17 are swung into the space between the opposed channel iron members 19 until the apertures in the bottoms of the links 17 are brought into alignment with the locking pins 43, which are then released and held by the springs 44 projected to secure the fixture to the trolley carrying frame.

In the particular constructional example illustrated, the article carrying frame is shown as adapted for use with both dead track sections and with a power driven conveyor chain. By "dead track sections" are meant, as is well known in the art, sections of conveyor track where the articles are propelled along the track section by hand or are permitted to remain stationary along such track section while fabricating operations are performed upon the articles being carried.

For the purpose of enabling the trolley with the articles carried thereby to be propelled by power, one of the trolley brackets 11 of each pair thereof that are employed to support the article carrying fixture 24, 25 is provided with a pair of spaced upwardly extending projections 60, between which is adapted to be engaged a downwardly projecting dog 61 arranged at the lower end of a trolley bracket 62. At its upper end the bracket 62 is flared outwardly and carries a pair of trolley wheels 63 adapted to engage with and be supported by the lower web of an I-beam trolley track 64. The bracket 62 projects into a center link 65 of an endless conveyor chain 66 which is driven in the well-known manner by any suitable driving means, not shown. The I-beam track 64 is suitably secured from the ceiling or superstructure of the plant while the load carrying tracks 10 are likewise suitably secured by means of brackets 67 which are flared outwardly, as shown in Fig. 3, to provide clearance space for the power driven conveyor chain 66 and the supports therefor.

In Figs. 5 and 6 of the drawings is shown a modified type of construction in which the fixture 70 is designed and adapted for the carrying of an airplane wing section 71. In this form of the invention the power driven trolley, the power driven conveyor chain, consisting of a track 64, trolley bracket 62, trolley wheels 63, and dog 61 is also employed, the dog 61, the same as the form shown in Figs. 1 to 4, inclusive, being adapted to be engaged between the spaced projections 60 of a trolley bracket 11a.

A pair of trolley brackets 11a arranged in spaced relationship is also provided. These brackets are secured at their lower ends to a top frame member 72. Adjacent to each side thereof the top frame member 72 has secured to it a pair of depending posts 73, 74 which are truss braced as at 75 to the top frame member 72. At their lower ends the posts 72 have pivotally connected to them the brackets 76, each of which consists of a pair of side plate members 22a, similar to the side plates 22 as in the form shown in Figs. 1 to 4. Each of the side plate members 22 carries a pair of rollers 23, which are adapted to project within the webs of an I-beam ring fixture 80, 81.

As shown in Fig. 6, the fixture 80 is provided with a cross brace 82, to which is adapted to be secured the attachment lugs 83 with which the wing section 71 is provided. A bracket 84, also suitably secured to the ring member 80, is also provided with the means whereby the other attachment fixtures 85 of the wing section are securely fastened to the ring fixture 80.

As shown in Fig. 7, the other ring fixture 81 is provided with two pairs of brackets 86, 87, by means of which the other end of the wing section may be securely fastened to the ring fixture 81.

For the purpose of holding the article carrying frame 70 against objectionable side swaying when fabricating operations are being performed upon the wing section 71, the ring fixture 81 has secured to it a bracket 90 which is provided with a locking pin 91, similar to the locking pin 50 for engagement with any one of the plurality of holes 55a. A locking post 92 projects downwardly from the lower end of the bracket 90 and is adapted to be fitted within a socket 93 seated in the floor. A pin 94 projects laterally from the top of the locking post 92 and through an elongated slot 95 in the bracket 90 and is adapted to be engaged with a lateral extension 95a of the slot 95 to hold the post 92 in an upper elevated inoperative position.

As will be understood, each of the side plate members 22a is provided with a locking pin 50 similar to the pin 50 shown in Figs. 1 to 4 for holding the frames in locked, adjusted positions.

In Figs. 8 to 10 of the drawings is shown still another modified type of construction for carrying an airplane wing section 100 of different configuration. As shown in these figures, the trolley frame 70a is similar in construction to the frame 70 shown in Figs. 5 to 7, inclusive, and is supported upon a track 10a by means of the trolley brackets 11a, which are also adapted to be engaged with and driven by a power driven conveyor chain 66, supported from the track 64 by trolley brackets 62 and trolley wheels 63. As shown in Fig. 8, the supporting post 74a of the frame 70a carries at its lower end a bracket 101 secured to the lower end of the post 74a by the bolt 102. At its upper end the bracket 101 terminates in a cross member 103, to which is adapted to be secured, as by the bolts 104, the wing section 100. The lower end of the bracket 101 is rotatably supported upon the bolt 102.

At its lower end the depending post 73a of the trolley frame has pivotally secured to it by the bolt 105 a roller carrying frame 22b which carries rollers 23b for engagement with the ring fixture 110. The ring fixture 110 is provided with two pairs of bracket members 111, 112, by means of which the wing section 100 may be secured to the ring fixture. The ring fixture 110, like the fixtures heretofore described, is also provided with a plurality of spaced holes 55b with which a locking pin 50b may be engaged to hold the part in any desired adjusted position.

Secured to the lower end of the ring fixture 100 also by means of a locking pin 150 is a bracket 112 having mounted therein a locking post 92a for engagement with a socket or a slot 93a located in the floor and by means of which, when the locking post 92a is lowered, side swaying of the workpiece will be prevented when fabricating operations are being performed upon the work; the bracket 112 being provided with an elongated slot 95a with which a laterally extending pin 94a is engaged for holding the post in elevated position when the pin 94a is engaged within the lateral extension 95b of the slot.

In the form of the invention shown in Figs. 1 to 4, inclusive, the operation, as will be readily understood, is as follows: The clamping bolt 33 of a pair of article carrying support rings 24, 25 is unloosened so that the two sets of ring sections 26, 27, 28 may be spread or opened and the supporting frame consisting of the two channel irons 19 carrying the channel bars 20 and the side plates 22 which in turn carry the two article carrying rings 24, 25 are all preferably supported from a crane or the like with the crane hooks thereof passed through the U-shaped members 43. The ring is then lowered upon or about a radial type engine until the pads 41 carried by the central ring sections 26 engage with the uppermost V-shaped projections 42 of the engine; it being understood that after the bolt 33 is disengaged the ring sections 27, 28 will hang freely in a substantially vertical position from their respective hinges 29, 30 and so that these sections 27, 28 may readily be swung outwardly to clear the engine as the ring is being lowered. After the upper ring section 26 has been seated upon the projections 42, the hinged sections 27, 28 may be then readily swung into engagement with the remaining cylinders of the engine, the bolt 33 moved into engagement with the cross brace 34 and the nut 37 screwed down to tighten the fixture securely upon the engine. The fixture with the engine secured therein may then be raised by the crane to bring the channel bars 19 thereof in a position to be engaged with the pair of links 17 of the trolley frame, the lower ends of the link 17 are swung between the channel irons 19 while the pins 43 are held in their outward position until the holes in the bottom of the links 17 align with the pins 43 when the pins 43 may be released and the ends thereof will pass through the links and securely hold the same pivotally connected to the channel irons. The crane hooks are then disengaged and the weight of the article carrying fixture and radial engine will be supported entirely from the trolley wheels 11 and trolley frame 15, 17.

As will be understood when the article is supported by the trolley frame, the frame may be mounted for movement along a dead or non-power track section 10, so that it may be readily propelled along the track and held stationary at any desired point where fabricating operations are performed upon the part being transported.

It will also be understood that the track 10 may be so arranged that the trolley brackets and supporting frames may be moved into proximity to a power driven chain section such as indicated by the numerals 61 to 66, inclusive, and so that the driving lug 61 of the chain will engage between a pair of driving dogs 60 of the trolley bracket. At those points of the conveyor's line of travel where fabricating operations are to be performed, either when the bracket is on a non-power section of track or when it is being propelled along the track by the chain 65, 66, spaced channel bracing sections 125, as shown in Figs. 1 and 3, may be employed between which the links 17 will engage, thereby to prevent objectionable side swaying of the fixture and article carried thereby.

In the forms of the invention, shown in Figs. 5 to 10, inclusive, the rotatable ring-shaped supporting fixtures are also suitably secured to the article to be carried, at least one of the ring fixtures being connected to the main supporting framework by a transverse horizontal pivot, whereby it may be swung away from the other fixture to facilitate the securing of the article to be carried to the pair of fixtures. The fixtures and article carried thereby are then suitably secured to the trolley bracket supporting frame for movement along the track either by being propelled manually along said track or being driven by the chain 66. When it is desired to perform a fabricating operation on the article at any particular station, the locking pin 92 is engaged within a socket 93 suitably located at such station to prevent objectionable side swaying.

It will be understood that in each form of the invention, the article is rotatably supported by a ring fixture so that it may be rotated upon a horizontal axis to bring any part of the article within easy accessibility to an operator standing on the floor and that the frame may be locked in any desired position to which it has been rotated by means of the locking pins 50. It will also be understood that in each form of the invention, the trolley brackets with the article carrying fixture and the article supported therein may be manually propelled along the supporting track or may be power driven in accordance with the particular design of the installation.

It will further be understood that in each particular modification illustrated, the supporting framework 18, 19 and article carrying fixture carried thereby could be supported directly from the I-beam track 64 and connected permanently to the drive chain 66, in which case the channel tracks 10 would not be employed.

While I have shown certain modifications of the invention that have proven highly successful in practice, it will, of course, be understood that many changes, modifications and variations of the constructional details thereof may be resorted to without departing from the spirit of the invention as set forth in the claims hereunto appended.

I claim:

1. A device of the character described, comprising a supporting track, a pair of spaced trolley brackets mounted for movement longitudinally of said track, a supporting framework carried by said trolley brackets, an annular article-carrying fixture carried by said framework, and means for mounting said annular fixture for rotation relative to said framework upon an axis located substantially centrally of said annular fixture and extending longitudinally of said track, said means comprising a pair of rollers extending in spaced transverse relation to said supporting track and said annular fixture having an annular flange engaging said rollers for supporting said fixture rotatably from said supporting frame and trolley brackets.

2. A device of the character described, comprising a supporting track, a pair of spaced trolley brackets mounted for movement longitudinally of said track, a supporting framework carried by said trolley brackets, an annular article-carrying fixture carried by said framework, anti-friction bearings interposed between said article-carrying members and framework for mounting said article-carrying members for rotation upon an axis extending longitudinally of said track.

3. A device of the character described, comprising a supporting track, a pair of spaced trolley brackets mounted for movement longitudinally of said track, a supporting framework carried by said trolley brackets, a pair of ring-shaped article-carrying members supported by said framework and spaced relative to each other in a direction longitudinally of said track, anti-friction bearings interposed between said rings and framework for mounting said rings for rotation upon an axis extending longitudinally of said track and means for releasably locking said rings against rotation.

4. A device of the character described, comprising a supporting track, a pair of spaced trolley brackets mounted for movement longitudinally of said track, a supporting framework carried by said trolley brackets, a pair of ring-shaped article-carrying members supported by said framework and spaced relative to each other in a direction longitudinally of said track, anti-friction bearings interposed between said rings and framework for mounting said rings for rotation upon an axis extending longitudinally of said track and means for releasably locking said rings against rotation, said locking means comprising a locking pin and spring means for normally holding the same in engagement with said ring-shaped fixture.

5. A device of the character described comprising a supporting track, a pair of spaced trolley brackets mounted for movement longitudinally of said track, a supporting framework carried by said trolley brackets, an article-carrying fixture comprising flanged annular members, a supporting bracket, spaced rollers carried thereby for engagement with the flanges of said annular members, and means for detachably securing said supporting brackets and the members carried thereby to said supporting framework.

6. A device of the character described, comprising a supporting track, a pair of spaced trolley brackets mounted for movement longitudinally of said track, a supporting framework carried by said trolley brackets, an article-carrying fixture comprising flanged annular members, a supporting bracket, spaced rollers carried thereby for engagement with the flanges of said annular members, means for detachably securing said supporting brackets and the members carried thereby to said supporting framework, and means carried by said rings for detachably securing the same to an article to be carried thereby.

7. A device of the character described, comprising a supporting track, a pair of spaced trolley brackets mounted for movement longitudinally of said track, a supporting framework carried by said trolley brackets, an annular article-carrying fixture carried by said framework, said article-carrying fixture consisting of a pair of annular members each consisting of a plurality of I-beam members bent into circular form, means for pivotally connecting certain of said sections, means for detachably clamping said sections about an article to be carried thereby, and a plurality of rollers rotatably mounted on said supporting framework adapted to supportingly engage the concave inner surface of the outer flanges of said I-beam members in a manner facilitating the rotation of said fixture about a horizontal axis.

8. A device of the character described, comprising a supporting track, a pair of spaced trolley brackets mounted for movement longitudinally of said track, a supporting framework carried by said trolley brackets, a pair of supports depending from said framework and spaced longitudinally thereof, members carried by each of said supports for rotatably supporting an article from said framework upon a substantially horizontal axis, one of said members consisting of a ring-shaped I-beam member and means for detachably securing the same to an article to be carried thereby.

9. A device of the character described, comprising a supporting track, a pair of spaced trolley brackets mounted for movement longitudinally of said track, a supporting framework carried by said trolley bracket, an article-carrying fixture comprising a ring-shaped I-beam, members for detachably connecting an article to be carried thereby to said ring, members for rotatably supporting said ring and the article carried thereby from said supporting framework for rotation about a substantially horizontal axis and means for releasably locking said ring against rotation.

10. A device of the character described comprising a supporting track, a pair of spaced trolley brackets mounted for movement longitudinally of said track, a supporting framework carried by said trolley brackets, an article-carrying fixture comprising a ring-shaped I-beam, members for detachably connecting an article to be carried thereby to said ring, members for rotatably supporting said ring and the article carried thereby from said supporting framework for rotation about a substantially horizontal axis, and means for releasably locking said ring against rotation comprising a plurality of spaced holes in the web of said I-beam, a pin for engagement for any one of said holes and spring means for normally holding said pin in locking engagement within one of said holes.

11. A device of the character described comprising a supporting track, a pair of spaced trolley brackets mounted for movement longitudinally of said track, a supporting framework carried by said trolley brackets, a pair of supports depending from said framework and spaced longitudinally thereof, members carried by each of said supports for rotatably supporting an article from said framework upon a substantially horizontal axis extending longitudinally of said conveyor, one of said members consisting of an article supporting ring adapted to secure one end of an article to be carried thereby, a bearing for rotatably suspending said ring-shaped member from one of said supports upon a substantially horizontal axis extending longitudinally of said conveyor and a member carried by the other support for rotatably securing thereto the other end of an article to be carried.

12. In an overhead trolley conveyor system, a conveyor track, load supporting trolley mechanism adapted to travel along said track, a frame carried by said trolley mechanism, a plurality of rotatable rollers carried by said frame, and annular article-carrying fixture mechanism suspended from said rollers in a manner whereby rotation of said fixture mechanism about a substantially horizontal axis may be effected with a rolling contact between said fixture mechanism and said rollers.

13. In an overhead trolley conveyor system, a conveyor track, a plurality of longitudinally spaced load supporting trolleys adapted to travel along said track, a supporting framework carried by said trolleys, a plurality of longitudinally spaced rigid article-carrying fixtures carried by said framework, and bearing mechanism carried by said framework for mounting said fixtures for rotation relative to said framework about an axis extending longitudinally of said track.

14. A device of the character described comprising a supporting track, a pair of spaced trolley brackets mounted for movement longitudinally of said track, a supporting framework carried by said trolley brackets, an article-carrying fixture carried by said framework, and means for mounting said fixture for rotation relative to said framework upon a substantially horizontal axis, said fixture being characterized by an annular I-beam ring construction having the I-beam web in a vertical plane, and said means for mounting said fixture being characterized by horizontally spaced rollers adapted to engage the inner concave surface of the outer I-beam flange.

15. A device of the character described comprising a supporting track, a pair of spaced trolley brackets mounted for movement longitudinally of said track, a supporting framework carried by said trolley brackets, an article-carrying fixture carried by said framework, and means for mounting said fixture for rotation relative to said framework upon a substantially horizontal axis, said fixture being characterized by an annular I-beam ring construction having the I-beam web in a vertical plane, and said means for mounting said fixture being characterized by horizontally spaced pairs of opposed rollers adapted to engage the inner concave surface of the outer flange of said I-beam on either side of said web.

16. A device of the character described comprising a supporting track, a pair of spaced trolley brackets mounted for movement longitudinally of said track, a supporting framework carried by said trolley brackets, an article-carrying fixture carried by said framework comprising a pair of annular longitudinally spaced ring members, a plurality of rollers mounted on said framework for supportingly engaging a concave surface of each of said ring members in a manner whereby said fixture may be rotated about a substantially horizontal axis passing through the center of said ring members and whereby any movement of said axis relative to said framework will be opposed by the suspended weight of said fixture and article carried therein.

17. An overhead trolley conveyor system, comprising a supporting track, a pair of spaced trolley brackets mounted for movement longitudinally of said track, a supporting framework carried by said trolley brackets, an annular article-carrying fixture carried by said framework, members carried by said framework for mounting said annular fixture for rotation relative to said framework upon a substantially horizontal axis located centrally of said annular fixture, members mounted on said framework for locking said article-carrying fixture against rotation, and means located along the conveyor's line of travel to hold said fixtures and the articles carried thereby against side swaying.

18. An overhead trolley conveyor system, comprising a supporting track, a pair of spaced trolley brackets mounted for movement longitudinally of said track, a supporting framework carried by said trolley brackets, an annular article-carrying fixture carried by said framework, members carried by said framework for mounting said annular fixture for rotation relative to said framework upon a substantially horizontal axis located substantially centrally of said annular fixture, and fixed members located along the conveyor's line of travel to hold said supporting framework and article-carrying fixture against lateral movement relative to said supporting track.

19. An overhead trolley conveyor system, comprising a supporting track, a pair of spaced trolley brackets mounted for movement longitudinally of said track, a supporting framework carried by said trolley brackets, a pair of supports depending from said framework and spaced longitudinally thereof, members carried by each of said supports for rotatably supporting an article from said framework upon a substantially horizontal axis extending longitudinally of said conveyor, at least one of said members consisting of a ring-shaped I-beam adapted to carry an article, and a pivotal connection between said ring and one of said depending supports having a horizontal transverse axis to permit said ring to be swung to and from said other support.

20. An overhead trolley conveyor system, comprising a supporting track, a pair of spaced trolley brackets mounted for movement longitudinally of said track, a supporting framework carried by said trolley brackets, a pair of supports depending from said framework and spaced longitudinally thereof, mechanism for rotatably supporting an article from said framework upon a substantially horizontal axis extending longitudinally of said track including a ring-shaped article supporting member adapted to secure one end of an article to be carried thereby, bearings for suspending said ring-shaped member from one of said supports for rotation about a substantially horizontal axis extending longitudinally of said conveyor, mechanism carried by the other support for rotatably securing thereto the other end of an article to be carried, and a transverse pivot for said ring-shaped support accommodating movement of said ring-shaped member to and from said other support.

21. In a conveyor mechanism having a track and trolley mechanism adapted to move along said track, a workpiece carrying means comprising a frame carried by said trolley mechanism, a rotatable work piece fixture carried by said frame having a substantially horizontal axis of rotation, and adjustable holding mechanism adapted to retain said fixture in any of a plurality of positions against rotation thereby to provide convenient access to different portions of a workpiece carried by said fixture as in performing successive operations on said workpiece.

22. In a conveyor mechanism comprising a track and trolley mechanism adapted to move along said track, a workpiece carrying means comprising a frame suspended from said trolley mechanism, a rotatable workpiece fixture suspended from said frame having a substantially horizontal axis of rotation, and adjustable holding mechanism adapted to retain said fixture in any of a plurality of positions against rotation thereby to provide convenient access to different portions of a workpiece carried by said fixture as in performing successive operations on said workpiece.

23. In an overhead trolley conveyor system having a conveyor track and load supporting trolley mechanism adapted to travel along said track, a workpiece carrying means comprising a frame carried by said trolley mechanism, at least one rigid workpiece fixture suspended from said frame, bearing mechanism carried by said frame accommodating rotation of said fixture about a substantially horizontal axis, and adjustable holding mechanism adapted to retain said fixture in any of a plurality of positions against rotation thereby to provide convenient access to different portions of a workpiece carried by said fixture as in performing successive operations on said workpiece.

ANDREW G. ROSE.

REFERENCES CITED

The following references are of record in the file of this patent:

UNITED STATES PATENTS

| Number | Name | Date |
| --- | --- | --- |
| 870,363 | Henning | Nov. 5, 1907 |
| 1,417,528 | Irish et al. | May 30, 1922 |
| 1,500,379 | Englund | July 8, 1924 |
| 1,725,264 | Garnett | Aug. 20, 1929 |
| 1,734,175 | McCabe | Nov. 5, 1929 |
| 1,774,863 | Young | Sept. 2, 1930 |
| 1,949,691 | Neher et al. | Mar. 6, 1934 |
| 2,039,473 | Bennington | May 5, 1936 |
| 2,212,695 | Nash | Aug. 27, 1940 |
| 2,329,613 | Hokanson et al. | Sept. 14, 1943 |
| 2,344,155 | McBride et al. | Mar. 14, 1944 |

FOREIGN PATENTS

| Number | Country | Date |
| --- | --- | --- |
| 648,813 | Germany | Aug. 9, 1937 |